May 22, 1951

R. B. DOME 2,554,457

CIRCUIT FOR INCREASING THE OUTPUT OF CLASS C AMPLIFIERS

Filed Dec. 6, 1947

Inventor:
Robert B. Dome,
by Merton D. Morse
His Attorney.

Patented May 22, 1951

2,554,457

UNITED STATES PATENT OFFICE 2,554,457

CIRCUIT FOR INCREASING THE OUTPUT OF CLASS C AMPLIFIERS

Robert B. Dome, Geddes Township, Onondaga County, N. Y., assignor to General Electric Company, a corporation of New York Application December 6, 1947, Serial No. 790,134

5 Claims. (Cl. 179—171)

My invention relates to amplifier systems, and more particularly, to amplifier systems of the class C type in which current flows intermittently. It is a primary object of my invention to provide improved performance characteristics of such systems.

As is well known in the art, a class C amplifier is one in which the grid is biased appreciably beyond cutoff, so that no anode current flows in the absence of alternating grid signal voltage, and so that anode current flows for appreciably less than one-half of each cycle when an alternating signal voltage is applied to the control electrode of the amplifier tube.

In power amplifiers, the operating efficiency is a primary consideration. Class C operation affords the highest efficiency obtainable, however, increased efficiency is accompanied by a corresponding decrease in obtainable output. An efficiency maximum of 78.5% is obtainable when anode current flows during exactly one-half of each cycle, and 100% efficiency is theoretically obtainable when no anode current flows. Thus, a compromise is necessitated between efficiency of operation and available output power.

It is known in the art that increased efficiency with a given output power may be obtained if the anode current can be made to flow in essentially rectangular pulses at the time that the instantaneous anode voltage is at or near its minimum. Various methods have been employed for providing the desired rectangular anode current waveform, such methods customarily taking the form of a saturated positive grid voltage or of complicated circuits involving auxiliary tubes.

It is a particular object of my invention to provide improved means for obtaining increased efficiency of operation of a class C amplifier while maintaining comparable power output.

Another object of my invention is to provide improved means for increasing the operating efficiency of a class C amplifier by squaring off the tops of the anode current pulses of the amplifier tube.

A further object of my invention is to provide improved means for increasing the operating efficiency of a class C push-pull electronic amplifier.

A still further object of my invention is to provide simplified means for attaining these results without consuming excessive grid driving power and without using auxiliary tubes.

Figure 1:
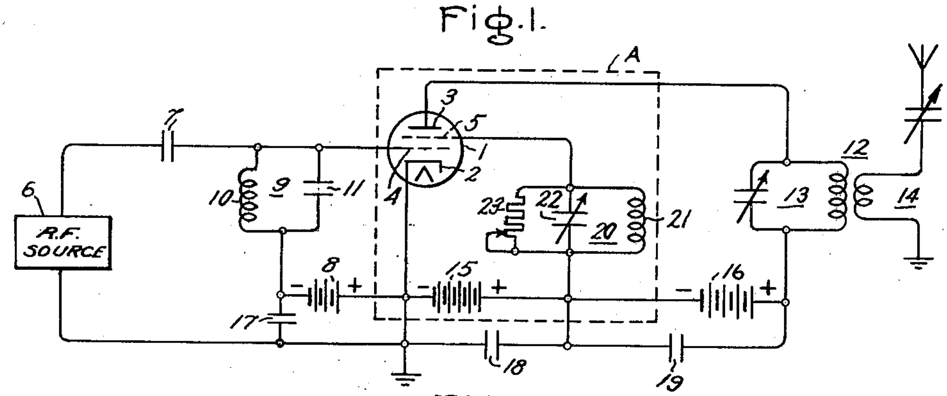
Figure 2:
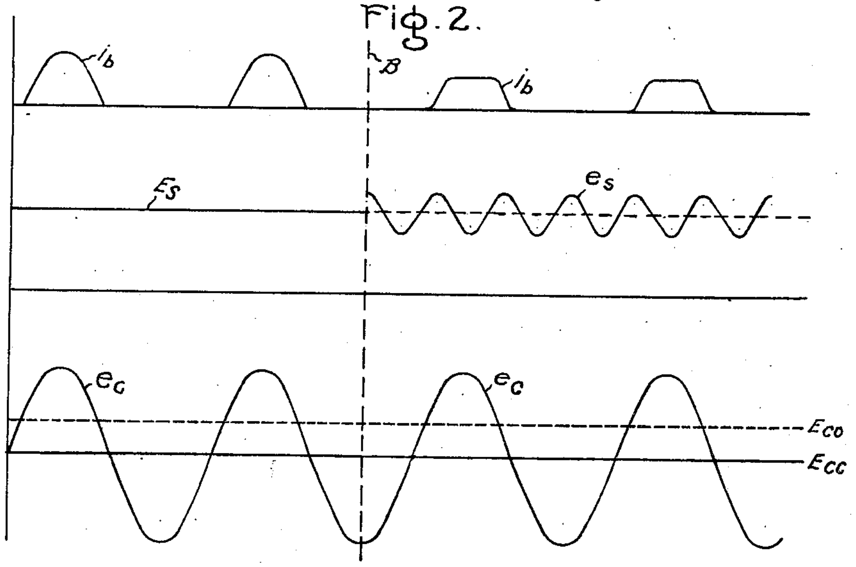
Figure 3:
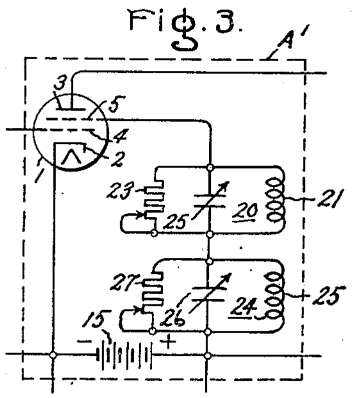
Figure 4:
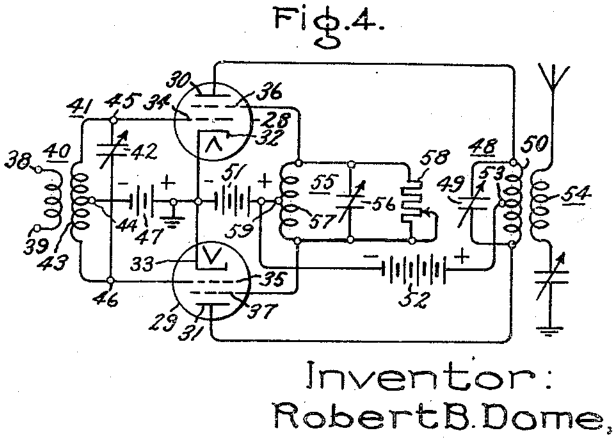

The features of my invention which I believe to be novel, are set forth with particularity in the appended claims. My invention itself, however, together with further objects and advantages thereof, may best be understood by reference to the following description taken in connection with the accompanying drawings, in which Fig. 1 is a schematic diagram of an amplifier circuit which suitably embodies my invention; Fig. 2 is a graphical representation of the several pertinent waveforms associated with the circuit of Fig. 1; Fig. 3 is a schematic diagram of a modification of that portion of the circuit of Fig. 1 within the dashed rectangle A; and Fig. 4 is a schematic circuit diagram showing a further modification of my invention. Like reference numerals indicate like elements in the several figures.

Referring to the circuit shown in Fig. 1, an electron discharge device 1 having cathode, anode, control, and screen electrodes 2, 3, 4, 5, respectively, serves as an amplifier of radio frequency energy. A source of radio frequency energy 6 is connected to the control electrode 4 of device 1 by means of coupling capacitor 7. The control electrode 4 is connected to a source of negative unidirectional bias voltage, here shown as a battery 8, through a tuned grid circuit 9 comprising an inductance 10 and a capacitance 11. The anode 3 of device 1 is connected to an output circuit 12 comprising the customary parallel resonant circuit 13 coupled to a conventional antenna circuit 14. Positive unidirectional operating potential is applied to the anode 3 through circuit 13 from a suitable source, here shown as batteries 15 and 16. The cathode 2 of device 1 is connected directly to ground. The customary bypass condensers 17, 18, 19 are provided for the batteries 8, 15, 16, respectively. The screen electrode 5 of device 1 is supplied with positive direct operating potential from battery 15 through a tuned circuit 20 comprising an inductance 21, a variable capacitance 22, and a variable damping resistance 23, all connected in parallel.

In operation, the control electrode 4 of device 1 is biased beyond cutoff so that the circuit functions as a class C amplifier. With damping resistance 23 short circuited, the anode circuit 13 is tuned to the input frequency in the usual manner, and the antenna circuit 14 is tuned for optimum output. The screen circuit 20 is tuned by means of variable capacitance 22 to a frequency which is, for purpose of example, assumed to be the third harmonic of the input frequency. In certain applications, it may be desirable to tune the screen circuit 20 to other harmonics of the input frequency. Damping resistance 23 provides a control over the magnitude of the harmonic screen voltage. As the damping resistance 23 is slowly increased from zero, a third harmonic voltage appears on the screen electrode 5 in such a phase as to reduce the peak anode current, since the anode current of a screen-grid tube is a function of both control grid and screen grid instantaneous potentials. This reduced peak anode current results in a decrease in average direct anode current in device 1, and consequently, in decreased output power. In order to bring the average direct anode current of device 1 to its original value, the control grid excitation is slightly increased. This adjustment results in an increase in power output while the anode dissipation remains constant. Hence, the operating efficiency of device 1 has been increased.

Referring to Fig. 2, there is shown a graphical representation of the instantaneous anode current, screen voltage, and control grid voltage of the device 1. The section to the left of the broken line B represents conventional operation of the circuit of Fig. 1, with anode current $i_b$ flowing for less than one-half of the input cycle, and with a fixed screen potential $E_s$. The control grid bias $E_{cc}$ is set below the cut-off value $E_{co}$. It will be noted that the anode current waveform is substantially peaked. As the third harmonic voltage $e_s$ is introduced in the screen grid circuit (shown in the section to the right of the broken line B), the anode current $i_b$ is made to flow in substantially rectangular pulses. As is well known in the art, optimum operating efficiency of a class C amplifier obtains when the anode current is made to flow in rectangular pulses at the time that the anode voltage is at or near its minimum. Consequently, the increase in operating efficiency depends on the extent to which this optimum condition is approached. The section to the right of the dashed line B shows graphically the conditions obtained when the value of the damping resistance 23 (Fig. 1) has been adjusted to permit enough third harmonic voltage to be developed at the screen electrode 5 to substantially square off the top of the anode current wave. Merely by way of illustration, one adjustment which I have found to be satisfactory is to combine the control functions to obtain the substantially flat topped anode current waveform, and to adjust the bias voltage $E_{cc}$ to such a value that anode current flows during 140 degrees of the input cycle. A careful graphical analysis show that under these conditions the operating efficiency is 85.1%, as compared with the well known value of 78.5% obtainable when the anode current flows for one-half of the input cycle with conventional operation.

As a further modification, it may be desirable to introduce more than one harmonic voltage in the screen circuit of the amplifier tube. Fig. 3 is a schematic diagram of a modification of that portion of a circuit of Fig. 1 within the dashed rectangle A, the remainder of the circuit being identical with that of Fig. 1. For purposes of example, I have shown means for introducing one additional harmonic of the input frequency in the screen circuit of device 1. Such means as shown take the form of an additional tuned circuit 24 comprising a parallel combination of an inductance 25, a variable capacitance 26, and a variable damping resistance 27, connected in series with the first tuned circuit 20. In this application the first tuned circuit 20 is tuned to the third harmonic and the second tuned circuit 24 is tuned to the second harmonic of the input frequency. It has been found that the introduction of the second harmonic as well as the third harmonic in the screen circuit results in a still further increase in operating efficiency. It will be understood that harmonics other than the second and third may be employed to advantage.

Referring to Fig. 4, there is shown in schematic form a push-pull amplifier circuit which suitably embodies my invention. I provide a pair of electron discharge amplifiers 28, 29 having respective anodes 30, 31, cathodes 32, 33, control grids 34, 35, and screen grids 36, 37. The cathodes 32, 33 are connected directly to ground. Radio frequency energy is supplied to the input terminals 38, 39 of an input transformer 40 from a suitable source, not shown. The secondary 41 of the input transformer 40 comprises a parallel combination of a variable capacitance 42 and a fixed inductance 43 having a center tap 44. The output terminals 45, 46 of the secondary 41 are connected directly to the control grids 34, 35. A suitable source of negative direct bias voltage, here shown as a battery 47, is connected between the center tap 44 on the secondary winding 43 and ground. The customary parallel resonant circuit 48 comprising a variable capacitance 49 and a fixed inductance 50 is connected in series with the anodes 30, 31 of amplifier tubes 28, 29. Substantially equal unidirectional operating voltages are supplied to the respective anodes 30, 31 from a suitable source, such as batteries 51, 52 through a center tap 53 on indutance 50. I have shown a conventional antenna circuit 54 coupled to the parallel resonant anode circuit 48, although it will be understood that the other types of load circuits may be employed. There is provided means for introducing harmonic voltages on the respective screen grids 36, 37, comprising a tuned circuit 55 which comprises a variable capacitance 56 and a tapped inductance 57. A variable damping resistance 58 is provided in parallel with tuned circuit 55. Substantially equal positive direct operating potentials are supplied from battery 51 to the screen grids 36, 37 through the center tap 59 of inductance 57.

In operation, the bias battery 47 is of such a value that the amplifier tubes 28, 29 are biased beyond cut-off. When a radio frequency signal is applied to the input terminals 38, 39, an amplified output voltage appears across the parallel resonant anode circuit 48, the operation of such a circuit being well known in the art. In order to increase the operating efficiency, the tuned screen circuit 55 is tuned to an odd harmonic of the input frequency; this introduction of harmonic voltage in the screen circuits serves to increase the operating efficiency in the manner heretofore described. The damping resistance 58 provides means for controlling the magnitude of the harmonic screen voltage. It will be noted that the circuit connection shown in Fig. 4 permits the introduction in the screen circuit of odd harmonics only, since even harmonics introduced in this manner are not in proper phase to decrease the peak anode current. Other circuit connections may be devised in cases where the introduction of even harmonics in the screen circuit is desirable.

While I have shown and described certain present preferred embodiments of my invention, it will be understood that numerous variations and modifications may be made, and I contemplate, in the appended claims, to cover all such variations and modifications as fall within the true spirit and scope of my invention.

What I claim as new and desire to secure by Letters Patent of the United States is:

1. In an electronic amplifier of the class C type comprising an electron discharge device having an anode, a cathode, and control and screen electrodes, means for biasing said control electrode beyond cutoff, a source of high frequency energy connected between said control electrode and said cathode, an output circuit connected to said anode, said output circuit comprising a resonant circuit tuned to the frequency of said energy, and means for increasing the operating efficiency of said amplifier comprising at least one parallel resonant circuit tuned to a harmonic of said frequency and connected between said screen electrode and said cathode.

2. In an electronic amplifier of the class C type comprising an electron discharge device having an anode, a cathode, and control and screen electrodes, means for biasing said control electrode beyond cutoff, a source of radio frequency energy connected between said control electrode and said cathode, an output circuit connected to said anode, said output circuit comprising a resonant circuit tuned to the frequency of said energy, and means for increasing the operating efficiency of said amplifier comprising a parallel resonant circuit tuned to a harmonic of said frequency and connected between said screen electrode and said cathode.

3. In an electronic amplifier of the class C type comprising an electron discharge device having an anode, a cathode, and control and screen electrodes, means for biasing said control electrode beyond cutoff, a source of radio frequency energy connected between said control electrode and said cathode, an output circuit connected in series with said anode, said output circuit comprising a resonant circuit tuned to the frequency of said energy, and means for increasing the operating efficiency of said amplifier comprising a plurality of parallel resonant circuits tuned to different harmonics of said frequency and connected in series between said screen electrode and cathode.

4. In an electronic amplifier of the class C type comprising a pair of electron discharge devices connected in push-pull, each of said devices having a cathode, an anode, and control and screen electrodes, means for biasing said control electrodes beyond cutoff, a source of radio frequency energy connected between said control electrodes and said cathodes, an output circuit connected in series with said anodes, said output circuit comprising a resonant circuit tuned to the frequency of said energy, means for applying substantially equal positive unidirectional operating potentials to said anodes, means for increasing the operating efficiency of said amplifier comprising a parallel resonant circuit tuned to a harmonic of said frequency connected between said screen electrodes, and means for applying substantially equal positive unidirectional operating potentials to said screen electrodes.

5. In an electronic amplifier of the class C type comprising an electron discharge device having an anode, a cathode, and control and screen electrodes, means for biasing said control electrode beyond cutoff, a source of high frequency energy connected between said control electrode and said cathode, an output circuit connected to said anode comprising a resonant circuit tuned to the frequency of said energy, and means for increasing the operating efficiency of said amplifier comprising a parallel resonant circuit tuned to an odd harmonic of said frequency connected between said screen electrode and said cathode.

ROBERT B. DOME.

REFERENCES CITED

The following references are of record in the file of this patent:

UNITED STATES PATENTS

| Number | Name | Date |
|---|---|---|
| 2,103,655 | Whitaker | Dec. 28, 1937 |
| 2,243,401 | Sturley | May 27, 1941 |

OTHER REFERENCES

Sarbacher, "Power-tube performance in class C amplifiers and frequency multipliers as influenced by harmonic voltage," pp. 607–625, Proceedings I. R. E., vol. 31, No. 11, November 1943.